July 12, 1927.

A. Y. DODGE

BALL JOINT

Filed Feb. 27, 1924

1,635,468

INVENTOR
ADIEL Y. DODGE
BY
ATTORNEY

Patented July 12, 1927.

1,635,468

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BALL JOINT.

Application filed February 27, 1924. Serial No. 695,566.

This invention relates to a ball joint of the type wherein an operating shaft end may have both sliding and oscillatory movement. I have chosen to illustrate my invention as applied to the control rod used for actuating a brake on a wheel of a moving vehicle, such as the front wheel of an automobile. In many of the designs heretofore used for this purpose, the surface of the operating parts has been exposed more or less to dust, mud, water, etc. This applies particularly to the spring for holding the cover cap in position.

It is the principal object of my invention to provide a joint for a shaft end in which the spring used in connection with the joint is completely enclosed within the joint, which is so constructed as to form substantially an oil tight enclosure.

Another object of my invention is to provide a joint which will be self-adjusting and anti-rattling for substantially the full life of the parts of the joint.

Another object of my invention is to provide a joint in which the parts can be made of stampings, thereby giving lightness and strength, and producing a joint that is cheap to manufacture.

These and other objects will be apparent to one skilled in the art after a study of the specification taken in connection with the annexed drawing, wherein.

Figure 1:
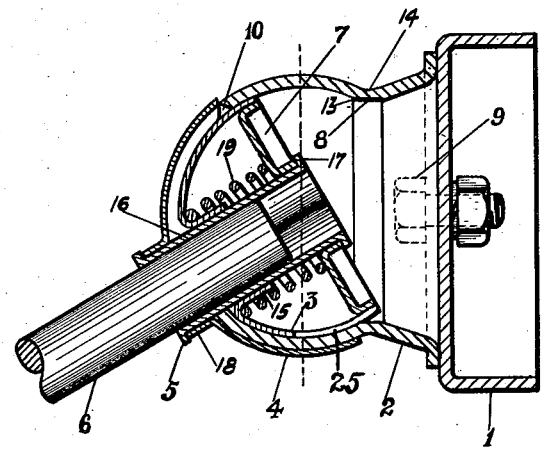
Figure 1 is a sectional view through the joint which is shown attached to the side member of a chassis, the shaft and its cooperating parts being shown as oscillated to its maximum position in one direction.
Figure 2:
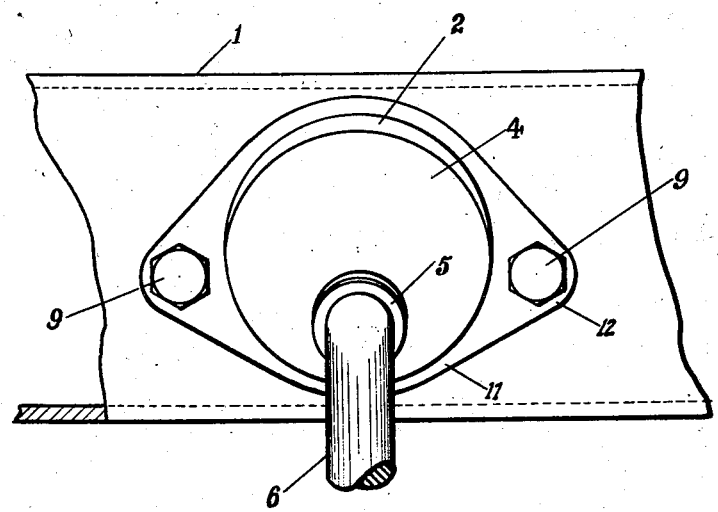
Figure 2 is a plan view of Fig. 1, but with the mounting lugs and bolts displaced from the center line for a purpose that will be hereafter described.

Referring now to the details wherein like numbers refer to corresponding parts in the various views, 1 is the channel member of the chassis frame to which the body member 2 of the joint is adapted to be fastened. The body 2 is preferably made by stamping up a piece of metal so that it has an annular flange 11 having lugs 12 thereon, through which the bolts 9 pass for fastening the member 2 to the frame member 1. As shown in Fig. 1, the bolts 9 are substantially on a center line with the joint, while in Fig. 2 the lugs 12 and bolts 9 are below the center line, in order that the joint may be moved upward on the frame member and at the same time the holding bolts will come in the horizontal center line of the channel member, it being a well-known fact that the holes in the channel member on this center line do not decrease the strength of the channel member as much as holes pierced in the channel at other points.

The body member 2 has its greater portion formed spherically, the spherical part on the inside being extended to the point 13, giving about 225 degrees on the inside and a few degrees more on the outer surface of the sphere. Furthermore after the body member 2 has been formed, a cylindrical hole 8 is bored at the point indicated to provide a passage for the cup or hemispherically shaped member 3, the rim of which is preferably slit in two or more places, whereby the rim can be forced inwardly toward its center in passing the member 3 through the circular opening 8. This may be done by providing radial cuts in member 3, extending inwardly from its edge, one of said cuts being shown at 25 in Fig. 1. The cup 3 has its bottom turned inwardly, forming a tubular seat 15, which is adapted to slidably fit the sleeve 16. On the inner end of the sleeve 16 is mounted a member 7, preferably in the form of a punched diaphragm, which is of such a diameter as to slightly spread the rim of the cup member 3 to bring it back into substantially a true spherical shape, conforming to the inner surface of the spherical part of member 2, although the rim of the cup 3 may have resilience enough to spring back into its true hemispherical shape after being pushed through the circular opening 8. After the diaphragm 7 has been put in position, the inner end of the sleeve 16 is spun over at 17 to prevent the diaphragm from sliding off, it being understood that the spring 19 is put in the position shown before the diaphragm 7 is assembled in position. The diaphragm 7 thus constitutes a brace for the sleeve 16 and assists in forming a more rigid support or bearing for the shaft 6 and thereby acts to carry the shaft load to the body member 2 without deflecting cup 3. On the outer end of the sleeve 16 is mounted a cap 4, whose central part is formed into an annular seat 18 and cap 4 is prevented from coming off the sleeve by the metal of the sleeve being spun over at 5. It is thus seen that the sleeve 16 passes through an opening in the spherical part of the body 2, the beginning of which opening is indicated at 10. The cap 4 closes the opening from the outside, while the cup 3 covers the opening from the inside, the cap and cup being held in close operative position with the outer and inner surface respectively of the spherical part of the body 2 by the spring 19, which further acts to automatically take up wear and prevent rattling in these parts.

The end of the shaft 6 is shown in position in the sleeve. It is to be understood that the shaft 6 is provided with the necessary operating lever, but since my present invention has to do with the joint itself, the other associated details are omitted.

It will be apparent that lubricant placed in this joint when it is assembled will remain there for a long time, and that the interior parts such as the spring and member 3 are fully protected from mud, dirt, dust, etc. By placing the spring inside the joint, a more compact design is secured.

While one illustrative embodiment has been described in detail, it is not my intention to limit the scope of the invention to that particular embodiment, or otherwise than by the terms of the appended claims.

Having thus described my invention, what I claim is:

1. In a device of the class described, a body portion having mounting means and a part which is spherically shaped, a support for said body portion, said body portion having an opening away from the support for a movable operating shaft, a hemispherically shaped member positioned within the spherically shaped part, a sleeve on which said hemispherically shaped member is mounted, a brace member on the sleeve and engaging the hemispherically shaped member adjacent its edge, a spring positioned between the brace member on the sleeve and the hemispherically shaped member, a cap carried by the sleeve for closing the said opening in the body portion, and a shaft movably positioned in said sleeve.

2. In a device of the class described, a body portion having mounting means and a part which is spherically shaped, a support for said body portion, said body portion having an opening away from the support for a movable operating shaft, a hemispherically shaped member positioned within the spherically shaped part, and fitting over said shaft opening, a sleeve on which said hemispherically shaped member is mounted, a circular brace member carried on the sleeve and having its outer periphery engaging the outer rim of the hemispherically shaped member, a spring positioned between the brace member and the hemispherically shaped member on the sleeve, a cap positioned on the outer end of the sleeve and slidably fitting over the opening in said body portion, and a shaft movably positioned in said sleeve.

3. In a joint, a shaft, a body portion having mounting means and a part which is spherically shaped with an opening therein, a sleeve slidably supporting one end of the shaft, a cup positioned on the sleeve intermediate the ends thereof, a diaphragm positioned on the inner end of the sleeve and closing the opening at the rim of the cup, a spring between the diaphragm and bottom of the cup, said cup fitting within the spherically shaped part of the body portion and closing said opening from the interior thereof and a cap positioned on the outer end of the sleeve and slidably fitting over the opening in the spherical part of said body portion for the purpose described.

4. In a joint, a shaft, a body portion having means for mounting the same on a support and a spherically shaped part with an opening therein, a sleeve slidably supporting one end of the shaft, a cup shaped member having its bottom formed inwardly forming a seat to slidably engage the sleeve intermediate its ends, a diaphragm positioned on the inner end of the sleeve for closing and bracing the rim of the cup member, and means on said end of the sleeve for preventing the diaphragm from slipping off, said cup being positioned within the spherically shaped part of the body portion and closing said opening from within, a cap positioned on the outer end of the sleeve and fitting over the opening in the spherical part of the body portion, and resilient means acting between the diaphragm and cup for holding the cup and cap in close engagement with the body portion for the purpose described.

5. In a joint for a shaft, a body portion having means for mounting the same on a support and a spherically shaped part with an opening therein, said body portion having a circular opening into the interior of the spherical part, a cup shaped member having its outer contour shaped to fit the interior of the spherical part of the body portion and slotted to be compressible to pass through said circular opening, a shaft sleeve passing through the opening in the spherically shaped part of the body portion and through the bottom of the cup, thereby being partly supported by the cup, a diaphragm positioned on the inner end of the sleeve and engaging the rim of the cup so as to slightly spread the same for the purpose described, a cap positioned on the outer end of the sleeve and fitting over the opening in the spherical part of the body portion, and resilient means acting between the diaphragm and cup for holding the cup and cap in close engagement with the body portion.

6. In a joint for a shaft, a body portion having means for mounting the same on a support and a spherically shaped part with an opening therein, said body portion having a circular opening into the interior of the spherical part, said circular opening being smaller in diameter than the interior diameter of the spherical part of the body portion, a hemispherically shaped member fitting the interior of the spherical part of the body portion and contractible so that it may be passed through said circular opening, a shaft sleeve partly supported by the hemispherically shaped member, a diaphragm positioned on the sleeve and engaging the rim of the hemispherically shaped member, a cap positioned on the outer end of the sleeve and fitting over the opening in the spherical part of the body portion, and a spring acting between the diaphragm and hemispherically shaped member for holding the same and the cap in close engagement with the body portion.

7. A support for a shaft comprising; a hollow body member formed with an annular flange having mounting lugs thereon and a spherical portion having an opening therein; a sleeve, through which said shaft may slide, oscillatably mounted in said opening; said sleeve mounting consisting of; a cup member and a brace member on the sleeve within the inner surface of the spherical part of the body member and a cap on the sleeve exterior to the outer surface of the said body member, and closing the opening in the spherical part thereof, and a spring acting between the brace and cup to hold the cup and cap in position so that said sleeve may be oscillated.

8. A support for a shaft, comprising; a hollow body member formed with an annular flange having mounting lugs thereon and a spherical portion having an opening therein; a stamped cup fitting within the spherically shaped part of the body member, a stamped cap fitting without the spherically shaped part of the body member and over the opening therein, a shaft sleeve extending within the hollow body member and movably carried by said cup and cap, a brace member positioned on the inner end of the sleeve, and a spring encircling the sleeve and acting between the brace and cup member to hold the cup and cap in proper position on the sleeve.

9. In a ball joint, a body member having a spherically formed part with an opening therein, two hemispherically shaped members one within and the other without the body member and closing the said opening, a sleeve through which a shaft may slide for oscillatably moving said hemispherically shaped members, a brace member on the inner end of the sleeve and a spring acting between the brace and one of said two members to hold said two members in proper working position on the sleeve.

10. In a ball joint, a hollow body member having a spherically formed part with an opening therein, two hemispherically shaped members one within and the other without the body member and closing the said opening, a sleeve through which a shaft may slide for oscillatably moving said hemispherically shaped members, and a spring for holding said two members in working position on the sleeve, said spring being housed within the body member and supported by the sleeve.

11. In a ball joint, a shaft, a body member having a spherically formed part with an opening therein, two hemispherically shaped members one within and the other without the body member and closing the said opening, a sleeve through which the shaft may slide for oscillatably moving said hemispherically shaped members, a member on the inner end of the sleeve to transmit load from the shaft and sleeve to the body member and a spring acting between said member on the sleeve and one of said two hemispherically shaped members to hold them in proper working position on the sleeve.

12. A universal support comprising, in combination, a stationary member comprising a tubular member having a flanged base at one end to be secured to a support and having at the opposite end a substantially spherical part surmounting the base and formed with a central opening, freely movable inner and outer semi-spherical parts embracing between them the spherical part of the stationary member, a device extending through the opening and supported by the inner and outer parts, and a spring inside the stationary member and operating directly on one of said parts and through said device on the other, to hold them yieldingly against the stationary member as they move, none of the parts projecting beyond the base of the stationary member.

13. A universal support comprising, in combination, a stationary member comprising a tubular member having a flanged base at one end to be secured to a support and having at the opposite end a substantially spherical part surmounting the base and formed with a central opening, freely movable inner and outer semi-spherical parts embracing between them the spherical part of the stationary member, and a spring inside the stationary member and operating directly on the inner one of said parts and indirectly on the outer one, to hold them yieldingly against the stationary member as they move, none of the parts projecting beyond the base of the stationary member.

14. A joint comprising, in combination, a stationary spherical body member, inner and outer cup-shaped members engaging respectively the inside and outside of the body member and formed respectively with inwardly and outwardly projecting tubular flanges, and an oscillatable part supported by said flanges, none of the parts projecting beyond the base of the body member.

15. A support comprising, in combination, a body member comprising a tubular portion having a base flange at one end adapted to be fastened to a support and having at the opposite end a partially-spherical part with a relatively large opening, a pair of cup-shaped members slidingly engaging the inside and outside of the partially-spherical part, and a member carried by the two cup-shaped members and passing through said opening, none of the parts projecting beyond the base of the body member.

In testimony whereof, I affix my signature.

ADIEL Y. DODGE.